W. HENRY.
PROCESS FOR MAKING TREADS FOR TIRES.
APPLICATION FILED JULY 6, 1914.

1,163,999.

Patented Dec. 14, 1915.

UNITED STATES PATENT OFFICE.

WALTER HENRY, OF NOTTINGHAM, ENGLAND.

PROCESS FOR MAKING TREADS FOR TIRES.

1,163,999. Specification of Letters Patent. Patented Dec. 14, 1915.

Application filed July 6, 1914. Serial No. 849,197.

*To all whom it may concern:*

Be it known that I, WALTER HENRY, a citizen of the United Kingdom of Great Britain and Ireland, formerly a resident of 49 Aldebert Terrace, Albert Square, Clapham, London, England, but now of Fountain Rubber Works, Chesterfield street, Nottingham, England, have invented certain new and useful Improvements in Processes for Making Treads for Tires, of which the following is a specification, such as will enable others skilled in the art to which it appertains to make and use the same.

This invention relates to a process for the manufacture of treads for resilient tires, particularly those for use on wheels of motor cars.

The invention relates to that kind of tread in which a large number of wires are embedded in the tread and are arranged end outwardly so as to contact with the ground, the wires used closely resembling card wire.

The treads may, according to my invention, have the wires arranged in sections and the wires may be mounted upon any suitable frame or backing, for example canvas or leather, and while I do not limit myself to any particular angle at which the wires pass through the tread, I preferably put them through in a slightly sloping or slanting position.

The invention concerns particularly the method in which the wires are forced through the material which forms the tread, and may be broadly described as consisting in laying the rubber when in plastic condition in grooves in a metal table or plate, placing the canvas or other backing carrying the wires, on to the plastic rubber with the wires pointing downwardly and applying pressure to the top of the canvas or other backing in such a manner as will force the wires through the rubber so as to form the rubber, wires and backing into one solid strip. Heat is preferably applied to the table, as by a gas burner underneath which would partly vulcanize the rubber and thus make the strip more fit to be handled for the purpose of applying it to the tire cover. Slots or other openings may be provided along the sides of the grooves to give easy egress to air bubbles.

Figure 1:
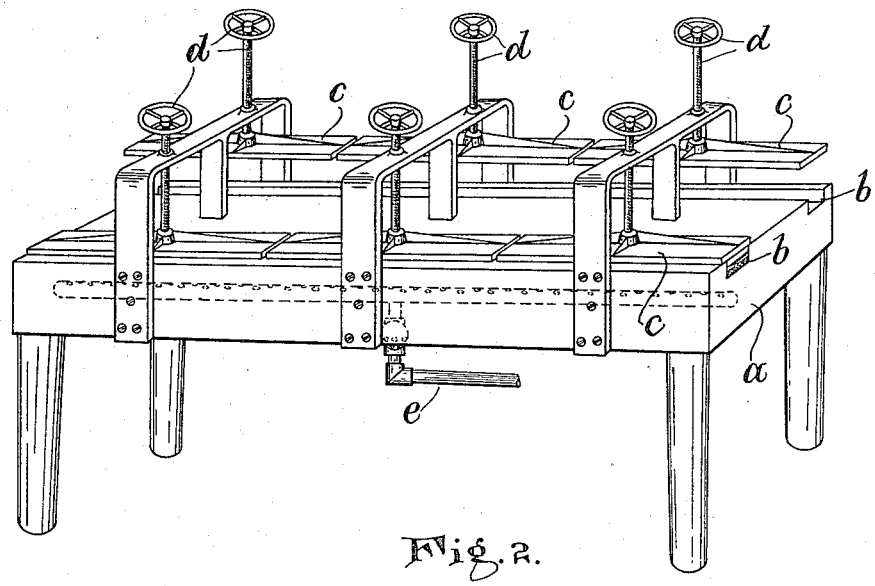
Figure 2:
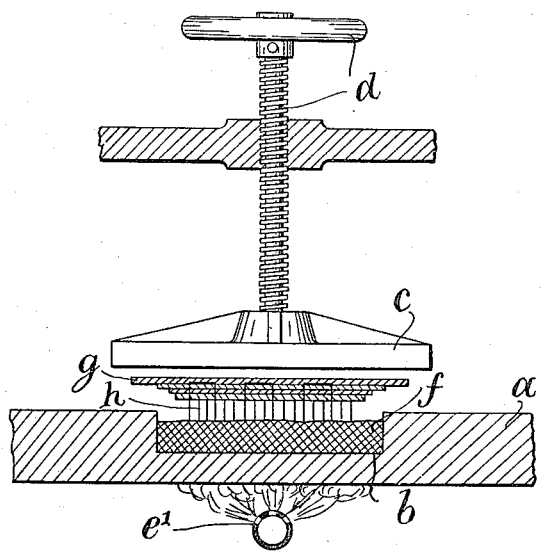

In the accompanying drawings Figure 1 is a perspective view of an apparatus for carrying out my process. Fig. 2 is an enlarged cross sectional view of a portion of the apparatus shown in Fig. 1.

I will now describe my invention with reference to the accompanying drawings.

Referring more particularly to Fig. 1 $a$ is a table having in it two grooves $b$ over which are arranged a number of pressing plates $c$, the plates over one groove being shown in lowered position and those over the other in raised position. The plates $c$ are provided with hand wheels and screws $d$ by which they can be raised or lowered. A gas burner from the pipe $e$ is shown under one of the grooves.

Fig. 2 is an enlarged cross sectional view of a portion of the table $a$ and shows a groove $b$ in which is placed plastic rubber $f$ upon which is arranged the backing $g$ with wires $h$ ready to be forced into the rubber $f$ by the action of the pressing plate $c$. A gas burner $e'$ is shown under the near grooved part of the table, and it will be apparent that when the wires are forced into the rubber and same is somewhat partly vulcanized, the strip formed will be very solid, easily handled and the wires will be most thoroughly embedded in the rubber.

The method of attaching the tread to the tire cover may be as desired, for example, the canvas or other backing may be keyed in place by rubber in the spaces between the sections of wires, or rivets may be employed, strips of canvas arranged across the spaces may be used or any other convenient means of securely fastening the tread to the tire cover may be adopted.

What I claim and desire to secure by Letters Patent is:—

1. A process for making treads for tires consisting in attaching wires in sections to a backing strip, placing plastic india rubber in a groove, and thereafter forcing said wires while still attached to the backing strip into the plastic india rubber.

2. A process for making treads for tires consisting in attaching wires to a backing strip with the ends of the wires pointing downwardly, placing plastic india rubber in a groove, and applying pressure to the top of the backing strip so as to force the wires into the plastic india rubber.

3. A process for making treads for tires consisting in attaching wires to a backing strip with the ends of the wires pointing downwardly, placing plastic rubber in a groove, applying pressure to the top of the backing strip so as to force the wires into the plastic india rubber in a slightly sloping direction, and applying heat so as to partly vulcanize the india rubber.

In witness whereof I have hereunto set my hand in presence of two witnesses.

WALTER HENRY.

Witnesses:
 THOMAS HUMBER,
 WILLIAM DUNSTAN KEMP.